Sept. 20, 1955 R. ADLER 2,718,553

SYNCHRONIZING SYSTEM

Filed July 27, 1951 3 Sheets-Sheet 1

INVENTOR.
ROBERT ADLER
BY Francis W. Crotty
HIS ATTORNEY.

INVENTOR.
ROBERT ADLER
BY Francis W. Crotty
HIS ATTORNEY.

Sept. 20, 1955 R. ADLER 2,718,553

SYNCHRONIZING SYSTEM

Filed July 27, 1951 3 Sheets-Sheet 3

INVENTOR.
ROBERT ADLER
BY Francis W. Crotty
HIS ATTORNEY.

United States Patent Office 2,718,553
Patented Sept. 20, 1955

2,718,553

SYNCHRONIZING SYSTEM

Robert Adler, Northfield, Ill., assignor to Zenith Radio Corporation, a corporation of Illinois Application July 27, 1951, Serial No. 238,939

23 Claims. (Cl. 178—69.5)

This invention relates to automatic frequency control systems and is particularly applicable to television receivers and the like. This application is a continuation-in-part of the copending application of the same inventor, Serial No. 105,034, filed July 15, 1949, and now abandoned, for "Combined Synchronizing Signal Slicer and AFC Phase Detector," and assigned to the present assignee.

A composite television signal as radiated from the transmitter, according to present standards, comprises video-signal components representing the picture information and synchronizing-signal components indicating the timing of the individual scansions of the image transmitted by the transmitter picture-converting device. For satisfactory reception of such composite television signals, it is necessary that the scansion of the image-reproducing device at the receiver be maintained in synchronism with the transmitted synchronizing-signal components.

According to present practice, a rectangular scanning pattern or raster is employed, and line-frequency synchronizing-signal pulses are transmitted as a part of the composite television signal to indicate the timing of the horizontal line trace intervals. At the same time, vertical scanning is employed to cause the trace to progress, line by line, over the entire raster, and field-frequency synchronizing-signal pulses are transmitted as a part of the composite television signal to indicate the timing of the vertical field trace intervals. As a refinement, it is customary to use interlaced scanning to reduce undesirable flicker effects.

For satisfactory picture reproduction at a receiver, it is imperative that the scansion of the cathode-ray beam of the image-reproducing device be controlled in exact synchronism with the received synchronizing-signal components of the composite television signal, which components in turn represent the timing of the scanning intervals at the transmitter. One well known system for accomplishing this desirable result employs a line-frequency local oscillator for driving the line-frequency sweep-signal generator which supplies suitable scanning signals to the appropriate deflection coils associated with the image-reproducing device. The line-frequency synchronizing-signal pulses, from the video detector or from one of the video amplifiers, are separated from the composite video signals by means of a clipping or slicing stage, and the resultant line-frequency pulses are impressed on a phase detector where they are compared in phase with a signal developed by the line-frequency scanning system. The phase detector conventionally comprises a double-diode arrangement having a balanced output which is utilized to control a reactance tube coupled to the line-frequency scanning system to maintain that system in synchronism with the incoming line-frequency synchronizing-signal pulses. Systems of this general type which have been proposed and used in the past employ separate stages for synchronizing-signal separation and phase comparison.

It is an important object of the present invention to provide a single-stage automatic-frequency-control phase-detector of an improved type.

It is a further object of the invention to provide an improved phase detector, particularly suitable for use in the synchronizing system of a television receiver or the like, successful operation of which is not dependent on separation of the line-frequency synchronizing-signal pulses from the composite video signal in a stage preceding the phase detector.

It is yet another important object of the present invention to provide an improved single stage, particularly suitable for use in a television receiver or the like, which functions as a combination field-frequency synchronizing-signal separator and line-frequency automatic-frequency-control phase-detector.

Patent 2,511,143 dated June 13, 1950, and Patent 2,559,037, dated July 3, 1951, both issued to Robert Adler and assigned to the present assignee, disclose and claim features of a novel electron-discharge device which fundamentally comprises an electron gun, a pair of control systems arranged in cascade, and a collector electrode or anode. Each of the control systems comprises an accelerating electrode having a slot or aperture followed by a grid at a distance greater than the smallest transverse dimension of the aperture. Each grid of such an electron-discharge device is characterized by a transfer characteristic comprising two input-voltage ranges of substantially zero transconductance separated by an input-voltage range of high transconductance. Since the grids are arranged in cascade along a single electron stream, their function is analogous to that of a pair of switches arranged in cascade in a wire circuit; space current flows to the anode only during those intervals when both grids are operating above cutoff potential.

In addition, each grid of such an electron-discharge device is characterized by a low input conductance for all values of input voltage.

For purposes of convenience in the present application, the terms "gated-beam electron-discharge device" and "gated-beam tube" are utilized to describe an electron-discharge device of this type, since in the presence of control voltages of sufficient magnitude each grid operates substantially as a beam gate, either allowing no space current to pass or allowing full space current to pass, depending on its instantaneous operating potential.

It is a further important object of the invention to provide a novel automatic frequency control system, particularly suited for use in a television receiver or the like, which utilizes a gated-beam tube to provide a unidirectional control potential which varies in magnitude in accordance with variations in the phase difference between the incoming line-frequency synchronizing-signal pulses and the locally generated signal from the line-frequency scanning system.

In accordance with the present invention, a new and improved synchronizing system for a television receiver comprises an image-reproducing device, a scanning system for controlling the scansion of the image-reproducing device, and a source of composite video signals including synchronizing-signal pulses. The system also comprises an electron-discharge device including an electron-emissive cathode, an accelerating electrode followed by a control grid, and a pair of additional electrodes. Positive-polarity composite video signals are applied between the control grid and the cathode from the composite video signal source, and means are coupled to the scanning system for applying between one of the additional electrodes and the cathode a comparison signal bearing a fixed phase relation to the scansion of the image-reproducing device. An output circuit is coupled to one of the additional electrodes and to the cathode for developing a unidirectional control signal indicative of the phase relation between the synchronizing-signal pulses and the comparison signal, and means are coupled to the output circuit and to the scanning system for utilizing the unidirectional control signal to effect phase synchronism of the scansion with respect to the synchronizing-signal pulses.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Throughout the specification and the appended claims, the term "composite television signal" is employed to describe the received modulated carrier signal, while the term "composite video signal" is used to denote the varying unidirectional signal after detection. The polarity of a composite video signal is determined by referring the synchronizing-pulse components to the video-signal components; thus, a "positive-polarity" composite video signal is one in which the synchronizing-signal pulses are positively oriented with respect to the video-signal components, while a "negative-polarity" composite video signal is one in which the synchronizing-pulse components are negatively oriented with respect to the picture information. The polarity of the composite video signal applied to the input circuit associated with a control grid is reckoned from the control grid to the cathode; for this purpose, the polarity is determined by considering the signal potential at the control grid with respect to cathode potential as a reference, regardless of whether grid-feed or cathode-feed is employed.

Figure 1:
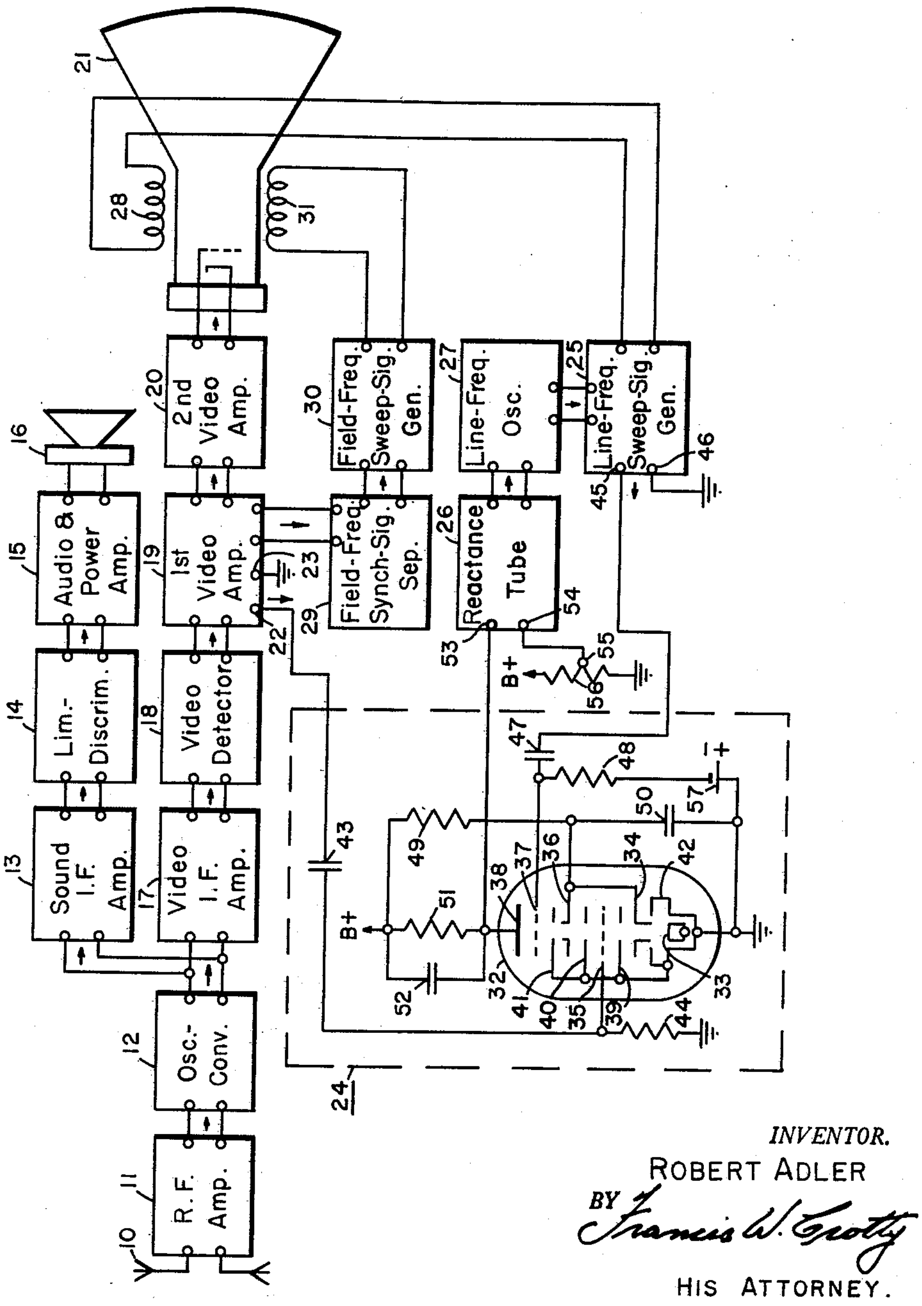
Figure 1 is a schematic diagram of a television receiver embodying the present invention.

With reference to Figure 1, incoming composite television signals are intercepted by an antenna 10, selectively amplified by any desired number of stages of radio-frequency amplification 11, and heterodyned with a locally generated heterodyne-signal in an oscillator-converter stage 12. Intermediate-frequency sound signals from oscillator-converter 12 are amplified by any desired number of stages of intermediate-frequency amplification 13 and are amplitude-limited and detected in a limiter-discriminator stage 14. Audio-frequency output from limiter-discriminator 14 is amplified by audio and power amplifier stages 15, the output of which is impressed on a loudspeaker 16 or other sound-reproducing device.

Intermediate-frequency video signals from oscillator-converter 12 are amplified by any desired number of stages of intermediate-frequency amplification 17 and are demodulated by a video detector 18. Composite video signals from the output of video detector 18 are amplified by first and second video amplifiers 19 and 20, and the amplified composite video signals are applied to the input circuit of an image-reproducing device 21, here shown as a cathode-ray tube.

Amplified composite video signals from output terminals 22 and 23 of first video amplifier 19 are impressed on an automatic frequency control stage 24, where the line-frequency synchronizing-signal pulses are compared in phase with a locally generated signal from a line-frequency sweep-signal generator 25. Automatic frequency control stage 24 operates to provide a unidirectional control potential which is indicative of the phase difference between the line-frequency synchronizing-signal pulses and the locally generated signal from line-frequency sweep-signal generator 25, and this unidirectional control potential is applied to a reactance tube 26 which controls the frequency of a line-frequency oscillator 27 driving line-frequency sweep-signal generator 25. Reactance tube 26 operates in response to the unidirectional control potential from automatic frequency control stage 24 to alter the frequency of line-frequency oscillator 27 in such magnitude and direction as to maintain the line-frequency sweep-signal generator 25, which is driven by line-frequency oscillator 27, in substantial synchronism with the line-frequency synchronizing-signal pulses. Line-frequency sweep-signals from generator 25 are applied directly to line-frequency deflection coil 28 associated with image-reproducing device 21.

Amplified composite video signals from first video amplifier 19 are also applied to a field-frequency synchronizing-signal separator 29. Output pulses from separator 29, which are in synchronism with the field-frequency synchronizing-signal pulse components of the composite video signal, are utilized to drive a field-frequency sweep-signal generator 30 which supplies suitable deflection signals to the field-frequency scanning coil 31 associated with image-reproducing device 21.

All portions of the receiver of Figure 1 except automatic frequency control stage 24 may be of conventional construction. It is to be clearly understood that automatic frequency control stage 24 is not limited in utility to application to a television receiver, and that the incorporation of stage 24 in a television receiver is shown for illustrative purposes only.

Automatic frequency control stage 24 comprises a gated-beam electron-discharge device 32, which may be of the type 6BN6, comprising in the order named a cathode 33, a first accelerating electrode 34, an input control grid 35, a second accelerating electrode 36, an auxiliary control grid 37, and an anode or plate electrode 38. Focusing electrodes 39, 40 and 41 are additionally provided, as disclosed in detail in the aforementioned Adler patents, and a beam-directing electrode 42 is arranged to cooperate with cathode 33 and first accelerating electrode 34 to constitute an electron gun. Focusing electrodes 39, 40 and 41 and beam-directing electrode 42 are internally connected to cathode 33. An internal connection is also provided between first and second accelerating electrodes 34 and 36.

Terminals 22 and 23 of first video amplifier 19, which serves as a source of positive-polarity composite video signals, are coupled to input grid 35 and to cathode 33 of gated-beam tube 32 by means of an input circuit preferably comprising an energy-storage device or condenser 43, connected between terminal 22 and input grid 35, and resistance means 44, coupled between input grid 35 and grounded cathode 33. The time constant of the input circuit comprising condenser 43 and resistor 44 is preferably selected to be at least as long as the period of the line-frequency synchronizing-signal pulse repetition frequency, to provide self-bias for the input grid.

Output terminals 45 and 46 of line-frequency sweep-signal generator 25 are coupled to auxiliary grid 37 and to cathode 33 by means which may comprise a coupling condenser 47 and a grid resistor 48. Accelerating electrodes 34 and 36 are connected to a suitable source of unidirectional operation potential, conventionally designated B+, through a voltage-dropping resistor 49 and are bypassed to ground by means of a condenser 50. Plate 38 is connected to B+ through a load impedance preferably comprising a resistor 51 and an integrating condenser 52 connected in parallel with resistor 51. Plate 38 of grated-beam tube 32 is direct-coupled to one input terminal 53 of reactance tube 26; the other input terminal 54 of reactance tube 26 is connected to a tap 55 on a voltage-dividing resistor 56 which is connected between B+ and ground. An anticipatory network (not shown) may be provided between plate 38 and reactance tube 22 in a manner well known in the art to insure initial lock-in.

In the copending application of Erwin M. Roschke et al., Serial No. 94,642, filed May 21, 1949, now U. S.

Patent No. 2,656,414, issued October 20, 1953, for "Signal Slicing Circuits," and assigned to the present assignee, there are disclosed and claimed several novel arrangements embodying a gated-beam tube as a synchronizing-signal separator in a television receiver or the like. As explained in detail in that application, when a positive-polarity composite video signal is applied between the input grid and the cathode of a gated-beam tube, and the input grid is suitably biased as by means of an input circuit having a time constant at least as long as the period of the line-synchronizing pulse repetition frequency, the electron flow through the input grid corresponds to an intermediate amplitude-portion of the incoming synchronizing-signal pulses. In other words, both transconductance cutoffs of the input grid transfer characteristic are utilized. As long as the incoming synchronizing-signal pulses are of greater amplitude, relative to the black level of the incoming composite video signal, than the high-transconductance input-voltage range of the transfer characteristic, all the space electrons flow through the input grid during the synchronizing-signal pulse intervals. Because the input grid is characterized by a low conductance for all input voltages, the separator is substantially insensitive to extraneous noise pulses which may be superimposed on the synchronizing-signal pulses, as explained in detail in the Roschke et al. application.

In the automatic frequency control stage 24, the first control system of gated-beam tube 32, comprising accelerating electrode 34 and input grid 35, functions in a manner identical with that of the Roschke et al. systems; that is, input grid 35 passes the entire space current flow only during the synchronizing-signal pulse intervals. However, the space electrons passed by input grid 35 are not directly collected to produce discrete synchronizing pulses in the output, as in the Roschke et al. application. Instead a comparison signal from the line-frequency scanning system is applied between auxiliary grid 37 and cathode 33. Since auxiliary grid 37 has operating characteristics similar to those associated with input grid 35, it also acts as a beam gate, passing or rejecting the entire space current in accordance with its instantaneous potential relative to cathode 33. Thus, space current flows to anode 38 only during those intervals when both input grid 35 and auxiliary grid 37 are operating above cutoff, and the average voltage developed across the load impedance comprising resistor 51 and integrating condenser 52 is dependent upon the phase relation between the signals applied to input grid 35 and to auxiliary grid 37.

In order to provide maximum discrimination against extraneous noise, it is preferred that the comparison signal derived from the line-frequency scanning system and applied between auxiliary grid 37 and cathode 33 comprise substantially square-topped pulses individually having a duration of the same order of magnitude as that of the individual incoming synchronizing-signal pulses. Line-frequency oscillator 27, which drives line-frequency sweep signal-generator 25, is set to oscillate at a nominal frequency substantially equal to the repetition frequency of the line-frequency synchronizing-signal pulses. Under these conditions, the average voltage developed across resistor 51 varies in magnitude in accordance with the variations in the phase difference between the incoming line-frequency synchronizing-signal pulses and the comparison pulses derived from output terminals 45 and 46 of line-frequency sweep-signal generator 25. Such variations in the average voltage output from gated-beam tube 32 operate to alter the frequency of line-frequency oscillator 27, through the medium of reactance tube 26, in such magnitude and direction as to maintain substantial phase synchronism between the line-frequency scanning system and the incoming line-frequency synchronizing-signal pulses. The use of a reactance tube for this purpose is well known in the art, and a detailed description of its construction and manner of operation is therefore not deemed necessary; it should be pointed out, however, that the reactance tube may be either inductive or capacitive, depending on the synchronous phase relation between the comparison signal and the line-frequency synchronizing-signal pulses.

Figure 2A:
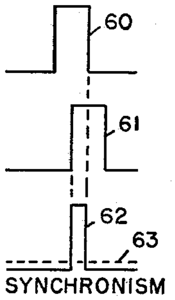
Figures 2A, 2B and 2C are simplified graphical representations useful in understanding the operation of the invention.
Figure 2B:
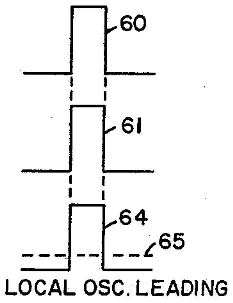
Figure 2C:
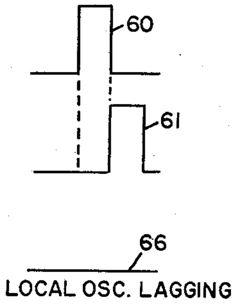

The operation of the automatic frequency control system may perhaps be better understood by reference to the simplified graphical representation of Figures 2A, 2B and 2C, in which three distinct conditions of operation are shown. Figure 2A depicts the condition obtained when the comparison signal is in synchronism and in the desired phase relation with the incoming line-frequency synchronizing-signal pulses. Pulse 60 of Figure 2A represents in simplified form the voltage appearing on input grid 35 during the presence of an incoming line-frequency synchronizing-signal pulse; during the intervals preceding and following pulse 60, which correspond to portions of the line trace intervals, input grid 35 is biased beyond cutoff by the self-biasing action of condenser 43 and resistor 44.

Pulse 61 represents the comparison pulse derived from terminals 45 and 46 of line-frequency sweep-signal generator 25 and applied between auxiliary grid 37 and cathode 33. During the intervals immediately preceding and following pulse 61, auxiliary grid 37 is biased below cutoff; for this purpose, a negative-bias battery 57 or other biasing source may be required.

As previously explained, the two grids 35 and 37 operate as beam gates arranged in cascade along a single electron stream. Consequently, space current flows to plate 38 only during the intervals when both grids are operating above cutoff. Pulse 62, then, represents the current which flows through the load impedance comprising resistor 51 and condenser 52. Since the input grid 35 is biased below cutoff during the line trace intervals, which intervals are many times longer than the synchronizing-signal pulse intervals, the average current flowing through resistor 51 and condenser 52 is much lower than the peak current of pulse 62, and may be represented by the dashed line 63.

Since it is desired that the condition depicted by Figure 2A is to be the condition for synchronism between the locally generated signal and the incoming synchronizing-signal pulses, reactance tube 26 is so adjusted, as by suitable adjustment of its initial bias, that the operating frequency of line-frequency oscillator 27 is exactly equal to the line-frequency synchronizing-signal pulse repetition frequency when the average unidirectional control potential applied to terminal 53 is equal to that developed at plate 38 in response to the average current represented by dashed line 63.

If, now, the operating frequency of oscillator 27 should momentarily increase, as the result of temperature changes or the like, so that the comparison signal instantaneously leads the condition for synchronism, the condition depicted at Figure 2B obtains. Under such a condition, the synchronizing-signal pulse 60 and the comparison pulse 61 are in time alignment so that space current flows to plate 38 during the entire synchronizing-signal pulse interval. The plate current through resistor 51 and condenser 52, then, is represented by pulse 64, and its average value is represented by dashed line 65. Reactance tube 26 is constructed and arranged, in a manner well known in the art, to decrease the frequency of oscillator 27 in response to a decrease in the unidirectional control potential applied to input terminal 53. When the local oscillator frequency increases, space current flows to plate 38 during a longer portion of each cycle, and the average potential of plate 38 decreases. Thus, the control potential applied to reactance tube 26 decreases with a resultant decrease in the operating frequency of oscillator 27, thereby restoring the receiver scansion to synchronism with the incoming line-frequency synchronizing-signal pulses.

If, on the other hand, the operating frequency of oscillator 27 momentarily decreases, so that the comparison pulse 61 lags with respect to the condition for synchronism, the condition depicted in Figure 2C obtains. In Figure 2C, comparison pulse 61 is shown lagging synchronizing-signal pulse 60 in such a manner that grids 35 and 37 are at no time simultaneously above cutoff. Under this condition, no space current flows to plate 38, and no voltage drop is developed across resistor 51 and condenser 52. This condition is represented by line 66. Since the control potential applied to terminal 53 of reactance tube 56 is greater than the average voltage required for synchronism, the frequency of oscillator 27 increases, tending to restore synchronism of the receiver scansion with respect to the incoming line-frequency synchronizing-signal pulses.

In practice, the control range of reactance tube 26 may be made sufficiently large to compensate for any amount of local oscillator drift which may be encountered in an oscillator of moderately good design.

It has been convenient to explain the operation of the system on the assumption that the signal applied between auxiliary grid 27 and cathode 33 comprises substantially square-topped pulses. However, satisfactory operation may be obtained by using comparison signals of other waveforms; for example, a sawtooth comparison signal may be employed.

Since it is only desired to derive an average direct potential output from the load impedance coupled to plate 38, feedthrough of the signal applied to auxiliary grid 37 to plate 38, by virtue of inter-electrode capacity, is not particularly deleterious. Therefore, the roles of grids 35 and 37 may be interchanged without substantial detrimental effect on the operation of the system.

In practice, it may be desirable to combine line-frequency oscillator 27 and line-frequency sweep-signal generator 25 in a single stage. For example, a sharply overdriven oscillator, operating Class C, may be utilized for this purpose, and a pulse-type or a sawtooth-wave comparison signal may readily be derived from such an oscillator for application to auxiliary grid 37.

In the embodiment of Figure 1, the use of a separate field-frequency synchronizing-signal separator 29 is necessitated because no output which corresponds to the field-frequency synchronizing-signal pulses is available from gated-beam tube 32. Field-frequency synchronizing-signal separator 29 may comprise, for example, a simple triode clipper with a series grid resistor, the input of which may be connected in parallel with that of gated-beam tube 32. However, the invention also contemplates embodiments in which field-frequency output pulses, as well as a unidirectional potential for maintaining synchronism between the line-frequency sweep-signal generator and the line-frequency synchronizing-signal pulses, may be derived. Several such embodiments are shown in schematic form in Figures 3–8.

Figure 3:
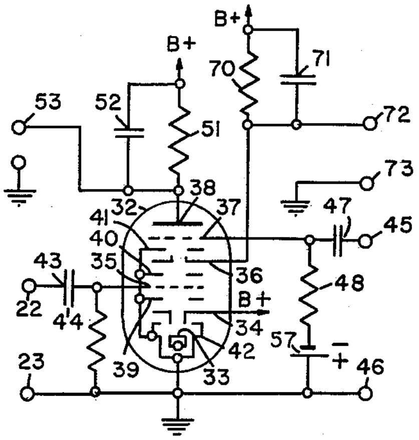
Figures 3–8 are schematic diagrams of other embodiments of the invention.

In the embodiment of Figure 3, this desired result is obtained by utilizing a gated-beam tube 32 in which first and second accelerating electrodes 34 and 36 are electrically separated. First accelerating electrode 34 is directly connected to B+, while second accelerating electrode 36 is connected to B+ through a load impedance comprising a resistor 70 and an integrating condenser 71 shunted across resistor 70. With this arrangement, input grid 35 operates to control the space current distribution between the accelerating electrodes 34 and 36, and negative-polarity output pulses, corresponding to the field-frequency synchronizing-signal pulses, appear between output terminals 72 and 73; the pulses applied to auxiliary grid 37 have no substantial deleterious effect on the field-frequency output pulses, due to the integrating action of condenser 71. In other respects, the circuit of Figure 3 is identical with that of automatic frequency control system 24 of Figure 1; however, since field-frequency output pulses are desired, it is preferable that the time constant determined by condenser 43 and resistor 44 be at least as long as the period of the field-frequency.

With the arrangement of Figure 3, field-frequency output pulses appear between terminals 72 and 73 by virtue of the fact that, with accelerating electrodes 34 and 36 connected in separate circuits, input grid 35 controls the space current distribution between first accelerating electrode 34 and second accelerating electrode 36 in a balanced fashion. It is apparent, then, that field-frequency output pulses of the opposite polarity may be obtained by connecting second accelerating electrode 36 directly to B+ and by connecting first accelerating electrode 34 to B+ through the parallel combination of resistor 70 and condenser 71.

Figure 4:
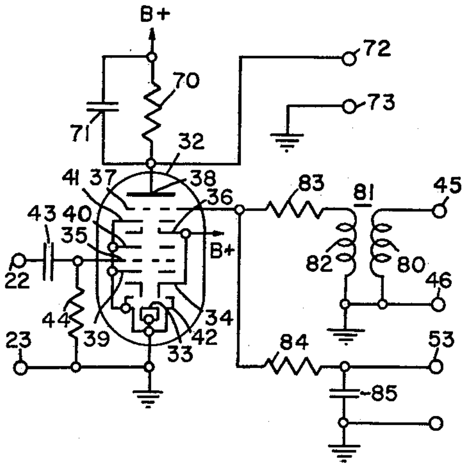

It is also possible, in accordance with the invention, to obtain the desired result by utilizing auxiliary grid 37 not only as an electrode for applying the phase comparison signal but also as an output electrode for the unidirectional control potential to be applied to reactance tube 26. Figure 4 is a schematic circuit diagram of an arrangement of this type. Terminals 45 and 46 of line-frequency sweep-signal generator 25 (Figure 1) are connected to opposite ends of the primary winding 80 of a transformer 81, one terminal of the secondary winding 82 of which is coupled to auxiliary grid 37 by means of a series resistor 83. The other terminal of secondary winding 82 is connected to terminal 46 and to ground. Auxiliary grid 37 is also connected to output terminal 53 by means including a series resistor 84, and terminal 53 is bypassed to ground by means of a condenser 85. The load impedance for deriving output pulses corresponding to the field-frequency synchronizing-signal pulses, comprising the parallel combination of resistor 70 and condenser 71, is connected between plate 38 and B+.

In the circuit of Figure 4, the comparison signal applied between terminals 45 and 46 may comprise positive pulses individually of time duration equal to that of the individual line-frequency synchronizing-signal pulses. Because this comparison signal appears across grounded secondary winding 82, and because the time duration of each pulse is short relative to the line trace interval between pulses, application of the comparison signal drives auxiliary grid 37 slightly negative during the intervals between pulses. The applied pulses are made of sufficiently small peak amplitude, however, that auxiliary grid 37 is never biased beyond cutoff. Consequently, the field-frequency synchronizing-signal pulse components are not suppressed from the anode circuit by the signal applied to auxiliary grid 37, and output pulses corresponding to the field-frequency synchronizing-signal pulses are derived between terminals 72 and 73.

The unidirectional control potential, which varies in magnitude in accordance with variations in the phase difference between the incoming line-frequency synchronizing-signal pulses and the comparison pulses applied to auxiliary grid 37, is developed across resistor 83 and secondary winding 82 by diode action of auxiliary grid 37 and cathode 33, and this unidirectional control potential is integrated by resistor 84 and condenser 85. The integrated control potential is then applied to reactance tube 26 (Figure 1) to control the frequency of oscillator 27, thereby maintaining synchronism between the receiver scansion and the line-frequency synchronizing-signal pulses.

Figure 5:
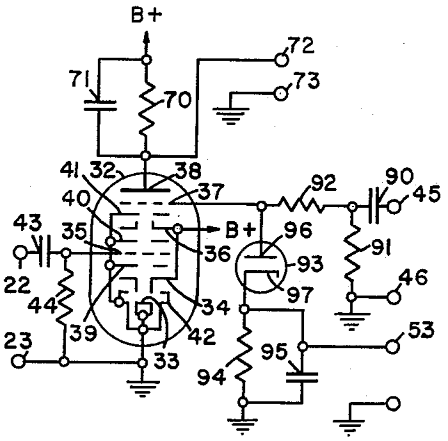

The magnitude of the unidirectional control potential which may be derived from the circuit of Figure 4 is limited by the small amount of current which may be drawn by auxiliary grid 37 (since this grid is characterized by low conductance for all values of grid voltage) and by the maximum size of load resistor 83, which is determined by frequency considerations and by the cutoff voltage of grid 37. Consequently, in order to obtain satisfactory operation, a particularly sensitive reactance tube 26 must be used. Figure 5 is a schematic circuit diagram of another embodiment of the invention, generally similar to the embodiment of Figure 4, but in which the magnitude of the unidirectional control potential is not subject to such severe limitations.

In the circuit of Figure 5, comparison pulses from terminals 45 and 46 are applied to auxiliary grid 37 by means of a resistance-capacitance coupling circuit, comprising a series condenser 90 and a shunt resistor 91, and a series resistor 92. Auxiliary grid 37 is also coupled to ground by means of a diode 93 or other unilaterally conducting device having a series load circuit comprising the parallel combination of a resistor 94 and a condenser 95. Diode 93 is arranged with its plate 96 connected to auxiliary grid 37 and its cathode 97 connected to the diode load impedance. In other respects, the circuit of Figure 5 is identical with that of Figure 4.

Diode 93 is arranged to conduct only during the comparison pulse intervals and therefore functions as a peak rectifier. In operation, then, the potential of diode plate 96 is dependent upon the phase relation between the incoming line-frequency synchronizing-signal pulses and the comparison pulses, due to the flow of grid current through resistors 92 and 91. Consequently, the unidirectional control potential developed across the diode load, comprising the parallel combination of resistor 94 and condenser 95, varies in response to changes in the peak value of the comparison pulses due to grid current flow. Such an arrangement, therefore, provides a control potential having as large an excursion as the maximum permissible comparison pulse peak amplitude.

Figure 6:
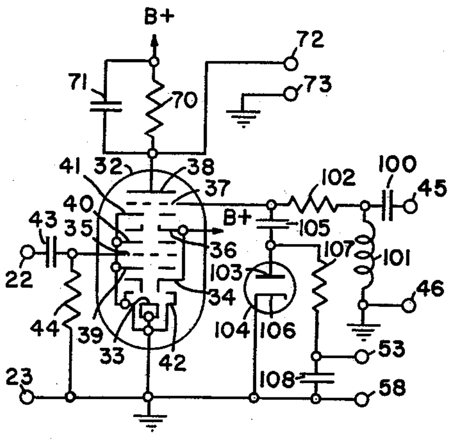

The circuit of Figure 5 provides a positive unidirectional control potential which varies in magnitude in accordance with the changes in the phase difference between the line-frequency synchronizing-signal pulses and the locally generated comparison signal. Figure 6 is a schematic diagram of an embodiment of the invention providing a negative unidirectional control potential.

In the embodiment of Figure 6, comparison pulses appearing between terminals 45 and 46 are coupled to auxiliary grid 37 by means of an inductance-capacitance coupling network, comprising a series condenser 100 and a shunt inductor 101, and a series resistor 102. Auxiliary grid 37 is coupled to the plate 103 of a diode 104 by means of a coupling condenser 105, and cathode 106 of diode 104 is grounded. A series load circuit, comprising a resistor 107 and a condenser 108, is connected between plate 103 and cathode 106 of diode 104. Output terminals 53 and 58 are connected to oposite terminals of condenser 108. In all other respects, the circuit of Figure 6 is identical with that of Figure 5.

The operation of the circuit of Figure 6 is substantially identical with that of the circuit of Figure 5; however, because the diode is connected in shunt with the output load impedance a negative unidirectional control potential is obtained.

As previously mentioned, the embodiments of Figures 4–6 are subject to a limitation on the maximum peak amplitude of the comparison pulses applied to auxiliary grid 37, which limitation is imposed by the maximum grid current which may be drawn and by frequency response considerations. The embodiment of Figure 7 provides a different arrangement in which the peak amplitude of the comparison pulses is not so limited.

Figure 7:
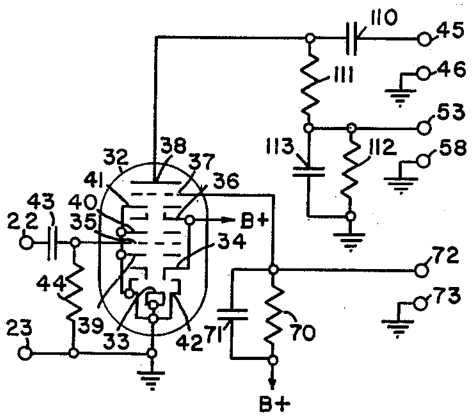

In the embodiment of Figure 7, comparison pulses appearing between terminals 45 and 46 are coupled to plate 38 of gated-beam tube 32 by means of a coupling condenser 110 and a pair of series-connected resistors 111 and 112 shunting terminals 45 and 46. A condenser 113 is connected in parallel with resistor 112. Output terminals 53 and 58 are connected to opposite terminals of the parallel network comprising resistor 112 and condenser 113.

Auxiliary electrode 37 is connected to B+ through the field-frequency load impedance comprising the parallel combination of resistor 70 and condenser 71, and output terminals 72 and 73 are connected to auxiliary electrode 37 and to ground respectively.

In operation, the embodiment of Figure 7 differs from those of Figures 4–6 in that the roles of auxiliary electrode 37 and plate 38 are interchanged. The comparison pulses are applied to plate 38, and the unidirectional control potential is derived from terminals 53 and 58 which are connected across resistor 112. The auxiliary electrode 37 is operated at a high positive potential, and the output pulses corresponding to the field-frequency synchronizing-signal pulses are derived from a load connected to auxiliary electrode 37.

This arrangement has the advantage that the peak amplitude of the comparison pulses may be much larger than in the embodiment of Figure 4, since plate 38 is capable of drawing much greater current than auxiliary electrode 37. Thus, a large change in average plate voltage may be obtained without the use of the auxiliary diode required in the embodiments of Figure 5 and Figure 6.

Furthermore, since plate 38 may be driven negative without greatly affecting space current to auxiliary electrode 37, plate 38 operates as its own peak detecting diode plate, and a high unidirectional control potential output may be obtained with comparison pulses having a moderate peak amplitude.

Figure 8:
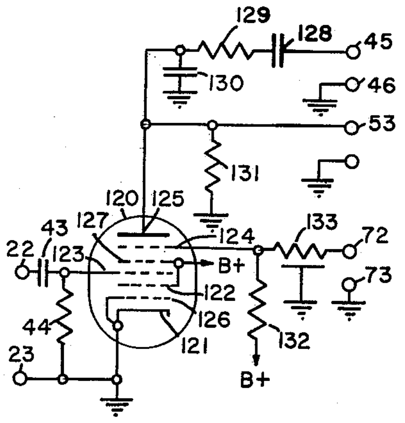

In all of the arrangements thus far described, a gated-beam tube is employed as a combined synchronizing-signal separator and automatic-frequency-control phase-detector. It is also possible in accordance with the present invention to achieve the desired operation by employing other types of electron-discharge device, as for example a modified conventional pentagrid converter tube such as the well-known type 6BE6. In the circuit of Figure 8, a tube 120 of this latter type is employed. Device 120 comprises an electron-emissive cathode 121, an accelerating electrode, in the form of a screen grid 122, followed by a control grid 123, and a pair of additional electrodes comprising an auxiliary electrode 124 and a plate 125; a tube of the type 6BE6 also comprises a control grid 126 between cathode 121 and screen grid 122 and a second screen grid 127 between control grid 123 and auxiliary grid 124. In a conventional type 6BE6 tube, the suppressor grid, corresponding to auxiliary electrode 124, is internally connected to the cathode, and an external lead is provided for the first grid 126; device 120 employed in the circuit of Figure 8 is modified by providing an external lead for the suppressor grid or auxiliary electrode 124 and internally connecting first grid 126 to cathode 121.

Positive-polarity composite video signals from terminals 22 and 23 are applied between control grid 123 and cathode 121 by means of an input circuit comprising condenser 43 and resistor 44. Screen grids 122 and 127 are connected together and to B+, and cathode 121 is grounded. The comparison signal from the line-frequency scanning system is applied between plate 125 and cathode 121, and the unidirectional control signal for application to the reactance tube is derived from an output circuit coupled to plate 125 and to cathode 121. Field-frequency output pulses are derived from an additional output circuit coupled to auxiliary electrode 124 and to cathode 121.

More specifically, terminal 45 of line-frequency sweep-signal generator 25 is coupled to plate 125 by means of a blocking condenser 128 and a wave-shaping network comprising a series resistor 129 and a shunt condenser 130. The time constant of resistor 129 and condenser 130 is made large with respect to the duration of an individual line trace interval. Consequently, pulse signals appearing between terminals 45 and 46 of line-frequency sweep-signal generator 25 are integrated, and the comparison signal applied between plate 125 and cathode 121 is of the form of a sawtooth voltage wave.

A resistor 131 is connected between plate 125 and ground, and the time constant of condenser 130 and resistor 131 is selected to provide the desired integration of the unidirectional control signal output. Terminal 53 of reactance tube 26 is direct-coupled to plate 125.

Auxiliary electrode 124 is connected to B+ through a load resistor 132, and the field-frequency output pulses developed across resistor 132 are partially integrated by means of an integrator 133 connected between auxiliary electrode 124 and output terminals 72 and 73.

In most respects, the operation of the circuit of Figure 8 is similar to that of the embodiment of Figure 7. By applying the input positive-polarity composite video signals to control grid 123 of pentagrid converter tube 120, which follows screen grid 122 and therefore exhibits a step-function type operating characteristic, synchronizing-signal slicing is achieved. The use of a sawtooth-wave comparison signal is not essential to the operation of the embodiment of Figure 8; integrating network 129, 130 may be replaced by other types of wave shaping network, such as a differentiating network, or by a simple wave-translating network as in the previous embodiments. Equivalent operation may also be achieved by employing electrically independent plate electrodes for the unidirectional control signal output and the field-frequency output pulses, leaving the suppressor grid connected to the cathode.

Thus, the present invention provides a new and improved single-stage synchronizing-signal separator and automatic-frequency-control phase-detector for use in a television receiver. The system is simple and inexpensive and affords operation comparable to that achieved by conventional prior art arrangements employing separate stages for synchronizing-signal separation and automatic-frequency-control phase-detection.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. A synchronizing system comprising: an image-reproducing device; a scanning system for controlling the scansion of said image-reproducing device; a source of composite video signals including synchronizing-signal pulses; an electron-discharge device comprising an electron-emissive cathode, an accelerating electrode followed by a control grid, and a pair of additional electrodes; means coupling said source to said control grid and to said cathode for applying positive-polarity composite video signals between said control grid and said cathode; means coupled to said scanning system for applying between one of said additional electrodes and said cathode a comparison signal bearing a fixed phase relation to said scansion; an output circuit coupled to one of said additional electrodes and to said cathode for developing a unidirectional control signal indicative of the phase relation between said synchronizing-signal pulses and said comparison signal; and means coupled to said output circuit and to said scanning system for utilizing said unidirectional control signal to effect phase synchronism of said scansion with respect to said synchronizing-signal pulses.

2. A synchronizing system comprising: an image-reproducing device; a scanning system for controlling the scansion of said image-reproducing device; a source of composite video signals including synchronizing-signal pulses; an electron-discharge device comprising an electron-emissive cathode, an accelerating electrode followed by a control grid, and a pair of additional electrodes; means coupling said source to said control grid and to said cathode for applying positive-polarity composite video signals between said control grid and said cathode; means coupled to said scanning system for applying between one of said additional electrodes and said cathode a comparison signal bearing a fixed phase relation to said scansion; an output circuit coupled to the other of said additional electrodes and to said cathode for developing a unidirectional control signal indicative of the phase relation between said synchronizing-signal pulses and said comparison signal; and means coupled to said output circuit and to said scanning system for utilizing said unidirectional control signal to effect phase synchronism of said scansion with respect to said synchronizing-signal pulses.

3. A synchronizing system comprising: an image-reproducing device; a scanning system for controlling the scansion of said image-reproducing device; a source of composite video signals including synchronizing-signal pulses; an electron-discharge device comprising an electron-emissive cathode, an accelerating electrode followed by a control grid, and an additional electrode; means coupling said source to said control grid and to said cathode for applying positive-polarity composite video signals between said control grid and said cathode; means coupled to said scanning system for applying between said additional electrode and said cathode a comparison signal bearing a fixed phase relation to said scansion; an output circuit coupled to said additional electrode and to said cathode for developing a unidirectional control signal indicative of the phase relation between said synchronizing-signal pulses and said comparison signal; and means coupled to said output circuit and to said scanning system for utilizing said unidirectional control signal to effect phase synchronism of said scansion with respect to said synchronizing-signal pulses.

4. A synchronizing system comprising: an image-reproducing device; a scanning system for controlling the scansion of said image-reproducing device; a source of composite video signals including synchronizing-signal pulses; an electron-discharge device comprising an electron-emissive cathode, an accelerating electrode followed by a control grid, and a plate; means coupling said source to said control grid and to said cathode for applying positive-polarity composite video signals between said control grid and said cathode; means coupled to said scanning system for applying between said plate and said cathode a comparison signal bearing a fixed phase relation to said scansion; an output circuit coupled to said plate and to said cathode for developing a unidirectional control signal indicative of the phase relation between said synchronizing-signal pulses and said comparison signal; and means coupled to said output circuit and to said scanning system for utilizing said unidirectional control signal to effect phase synchronism of said scansion with respect to said synchronizing-signal pulses.

5. A synchronizing system comprising: an image-reproducing device; a scanning system for controlling the scansion of said image-reproducing device; a source of composite video signals including synchronizing-signal pulses; an electron-discharge device comprising in the order named an electron-emissive cathode, an accelerating electrode followed by a control grid, an auxiliary electrode, and a plate; means coupling said source to said control grid and to said cathode for applying positive-polarity composite video signals between said control grid and said cathode; means coupled to said scanning system for applying between said auxiliary electrode and said cathode a comparison signal bearing a fixed phase relation to said scansion; an output circuit coupled to said plate and to said cathode for developing a unidirectional control signal indicative of the phase relation between said synchronizing-signal pulses and said comparison signal; and means coupled to said output circuit and to said scanning system for utilizing said unidirectional control signal to effect phase synchronism of said scansion with respect to said synchronizing-signal pulses.

6. A synchronizing system comprising: an image-reproducing device; a line-frequency scanning system for controlling the scansion of said image-reproducing device; a source of composite video signals including line-frequency and field-frequency synchronizing-signal pulses; an electron-discharge device comprising an electron-emissive cathode, an accelerating electrode followed by a control grid, and a plurality of additional electrodes; means coupling said source to said control grid and to said cathode for applying positive-polarity composite video signals between said control grid and said cathode; means coupled to said scanning system for applying between one of said additional electrodes and said cathode a comparison signal bearing a fixed phase relation to said scansion; an output circuit coupled to one of said additional electrodes and to said cathode for developing a unidirectional control signal indicative of the phase relation between said synchronizing-signal pulses and said comparison signal; means coupled to said output circuit and to said scanning system for utilizing said unidirectional control signal to effect phase synchronism of said scansion with respect to said synchronizing-signal pulses; and an additional output circuit coupled to one of said additional electrodes and to said cathode for developing output pulses corresponding to said field-frequency synchronizing-signal pulses.

7. A synchronizing system comprising: an image-reproducing device; a line-frequency scanning system for controlling the scansion of said image-reproducing device; a source of composite video signals including line-frequency and field-frequency synchronizing-signal pulses; an electron-discharge device comprising an electron-emissive cathode, an accelerating electrode followed by a control grid, and a plurality of additional electrodes; means coupling said source to said control grid and to said cathode for applying positive-polarity composite video signals between said control grid and said cathode; means coupled to said scanning system for applying between one of said additional electrodes and said cathode a comparison signal bearing a fixed phase relation to said scansion; an output circuit coupled to one of said additional electrodes and to said cathode for developing a unidirectional control signal indicative of the phase relation between said synchronizing-signal pulses and said comparison signal; means coupled to said output circuit and to said scanning system for utilizing said unidirectional control signal to effect phase synchronism of said scansion with respect to said synchronizing-signal pulses; and an additional output circuit coupled to another of said additional electrodes and to said cathode for developing output pulses corresponding to said field-frequency synchronizing-signal pulses.

8. A synchronizing system comprising: an image-reproducing device; a line-frequency scanning system for controlling the scansion of said image-reproducing device; a source of composite video signals including line-frequency and field-frequency synchronizing-signal pulses; an electron-discharge device comprising an electron-emissive cathode, an accelerating electrode followed by a control grid, and a plurality of additional electrodes; means coupling said source to said control grid and to said cathode for applying positive-polarity composite video signals between said control grid and said cathode; means coupled to said scanning system for applying between one of said additional electrodes and said cathode a comparison signal bearing a fixed phase relation to said scansion; an output circuit coupled to another of said additional electrodes and to said cathode for developing a unidirectional control signal indicative of the phase relation between said synchronizing-signal pulses and said comparison signal; means coupled to said output circuit and to said scanning system for utilizing said unidirectional control signal to effect phase synchronism of said scansion with respect to said synchronizing-signal pulses; and an additional output circuit coupled to a third one of said additional electrodes and to said cathode for developing output pulses corresponding to said field-frequency synchronizing-signal pulses.

9. A synchronizing system comprising: an image-reproducing device; a line-frequency scanning system for controlling the scansion of said image-reproducing device; a source of composite video signals including line-frequency and field-frequency synchronizing-signal pulses; an electron-discharge device comprising an electron-emissive cathode, an accelerating electrode followed by a control grid, and a pair of additional electrodes; means coupling said source to said control grid and to said cathode for applying positive-polarity composite video signals between said control grid and said cathode; means coupled to said scanning system for applying between one of said additional electrodes and said cathode a comparison signal bearing a fixed phase relation to said scansion; an output coupled to said one of said additional electrodes and to said cathode for developing a unidirectional control signal indicative of the phase relation between said synchronizing-signal pulses and said comparison signal; means coupled to said output circuit and to said scanning system for utilizing said unidirectional control signal to effect phase synchronism of said scansion with respect to said synchronizing-signal pulses; and an additional output circuit coupled to the other of said additional electrodes and to said cathode for developing output pulses corresponding to said field-frequency synchronizing-signal pulses.

10. A synchronizing system comprising: an image-reproducing device; a line-frequency scanning system for controlling the scansion of said image-reproducing device; a source of composite video signals including line-frequency and field-frequency synchronizing-signal pulses; an electron-discharge device comprising an electron-emissive cathode, an accelerating electrode followed by a control grid, an auxiliary electrode and a plate; means coupling said source to said control grid and to said cathode for applying positive-polarity composite video signals between said control grid and said cathode; means coupled to said scanning system for applying between said plate and said cathode a comparison signal bearing a fixed phase relation to said scansion; an output circuit coupled to said plate and to said cathode for developing a unidirectional control signal indicative of the phase relation between said synchronizing-signal pulses and said comparison signal; means coupled to said output circuit and to said scanning system for utilizing said unidirectional control signal to effect phase synchronism of said scansion with respect to said synchronizing-signal pulses; and an additional output circuit coupled to said auxiliary electrode and to said cathode for developing output pulses corresponding to said field-frequency synchronizing-signal pulses.

11. A synchronizing system comprising: an image-reproducing device; a line-frequency scanning system for controlling the scansion of said image-reproducing device; a source of composite video signals including line-frequency and field-frequency synchronizing-signal pulses; an electron-discharge device comprising an electron-emissive cathode, an accelerating electrode followed by a control grid, an auxiliary electrode, and a plate; means coupling said source to said control grid and to said cathode for applying positive-polarity composite video signals between said control grid and said cathode; means coupled to said scanning system for applying between said auxiliary electrode and said cathode a comparison signal bearing a fixed phase relation to said scansion; an output circuit coupled to said auxiliary electrode and to said cathode for developing a unidirectional control signal indicative of the phase relation between said synchronizing-signal pulses and said comparison signal; means coupled to said output circuit and to said scanning system for utilizing said unidirectional control signal to effect phase synchronism of said scansion with respect to said synchronizing-signal pulses; and an additional output circuit coupled to said plate and to said cathode for developing output pulses corresponding to said field-frequency synchronizing-signal pulses.

12. A synchronizing system comprising: an image-reproducing device; a line-frequency scanning system for controlling the scansion of said image-reproducing device; a source of composite video signals including line-frequency and field-frequency synchronizing-signal pulses; an electron-discharge device comprising an electron-emissive cathode, an accelerating electrode followed by a control grid, an auxiliary electrode and a plate; means coupling said source to said control grid and to said cathode for applying positive-polarity composite video signals between said control grid and said cathode; means coupled to said scanning system for applying between said auxiliary electrode and said cathode a comparison signal bearing a fixed phase relation to said scansion; an output circuit including a unilaterally conductive device coupled to said auxiliary electrode and to said cathode for developing a unidirectional control signal indicative of the phase relation between said synchronizing-signal pulses and said comparison signal; means coupled to said output circuit and to said scanning system for utilizing said undirectional control signal to effect phase synchronism of said scansion with respect to said synchronizing-signal pulses; and an additional output circuit coupled to said plate and to said cathode for developing output pulses corresponding to said field-frequency synchronizing-signal pulses.

13. A synchronizing system comprising: an image-reproducing device; a scanning system for controlling the scansion of said image-reproducing device; a source of composite video signals including synchronizing-signal pulses; a gated-beam electron-discharge device comprising in the order named an electron-emissive cathode, a first accelerating electrode, a first control grid, a second accelerating electrode, and a pair of additional electrodes comprising a second control grid and a plate; means coupling said source to said first control grid and to said cathode for applying positive-polarity composite video signals between said first control grid and said cathode; means coupled to said scanning system for applying between one of said additional electrodes and said cathode a comparison signal bearing a fixed phase relation to said scansion; an output circuit coupled to one of said additional electrodes and to said cathode for developing a unidirectional control signal indicative of the phase relation between said synchronizing-signal pulses and said comparison signal; and means coupled to said output circuit and to said scanning system for utilizing said unidirectional control signal to effect phase synchronism of said scansion with respect to said synchronizing-signal pulses.

14. A synchronizing system comprising: an image-reproducing device; a line-frequency scanning system for controlling the scansion of said image-reproducing device; a source of composite video signals including line-frequency and field-frequency synchronizing-signal pulses; a gated-beam electron-discharge device comprising in the order named an electron-emissive cathode, a first accelerating electrode, a first control grid, a second accelerating electrode, and a pair of additional electrodes comprising a second control grid and a plate; means coupling said source to said first control grid and to said cathode for applying positive-polarity composite video signals between said first control grid and said cathode; means coupled to said scanning system for applying between one of said additional electrodes and said cathode a comparison signal bearing a fixed phase relation to said scansion; an output circuit coupled to one of said additional electrodes and to said cathode for developing a unidirectional control signal indicative of the phase relation between said synchronizing-signal pulses and said comparison signal; means coupled to said output circuit and to said scanning system for utilizing said unidirectional control signal to effect phase synchronism of said scansion with respect to said synchronizing-signal pulses; and an additional output circuit coupled to one of said accelerating electrodes and to said cathode for deriving output pulses in synchronism with said field-frequency synchronizing-signal pulses.

15. An automatic frequency control circuit for an indirectly synchronized television picture tube deflecting system—said system being of the type which comprises beam-deflecting elements and a signal generator for generating deflection signals having a frequency at least in part determined by a control potential, and means for coupling said generator to said deflecting elements whereby to produce periodic beam-deflecting signals—comprising the combination of a normally nonconductive electron tube having at least anode, cathode, and control electrodes, means for applying to the anode of said tube retrace pulses of positive polarity, thereby to key said tube into conductivity, means for applying horizontal synchronizing pulses of positive polarity to said control electrode, whereby said tube generates periodic resultant pulses, the energy content of which varies with the relative phases of said synchronizing pulses and said retrace pulses, means for integrating said resultant pulses into said control potential, and means for applying said potential to said generator to maintain synchronism.

16. In a television receiver, a circuit for generating periodic control pulses comprising, in combination, a source of positive retrace pulses, a source of synchronizing pulses, a single tube having at least anode and cathode and control electrodes, means for applying said positive retrace pulses to the anode-cathode circuit of said tube, means for applying said synchronizing pulses to the cathode-control electrode circuit of said tube, and means for rendering the anode-cathode path of said tube non-conductive except during each interval of coincidence of a positive retrace pulse and a synchronizing pulse.

17. In a television receiver AFC system, a circuit for generating periodic pulses having a duration proportional to the phase displacement between synchronizing pulses and deflection-rate pulses comprising, in combination, a source of positive deflection-rate pulses, a source of synchronizing pulses, a single tube having at least anode and cathode and control electrodes, means for applying said positive deflection-rate pulses to the anode-cathode circuit of said tube, means for applying said synchronizing pulses to the cathode-control electrode circuit of said tube, and means for rendering the anode-cathode path of said tube non-conductive except during each interval of coincidence of a deflection-rate pulse and a synchronizing pulse.

18. In a television received AFC system, a circuit for generating periodic pulses having a time duration proportional to the phase displacement between synchronizing pulses and deflection-rate pulses comprising, in combination, a source of positive deflection-rate pulses, a source of positive synchronizing pulses, a tube having at least anode and cathode and control electrodes, means for applying said positive deflection-rate pulses to the anode-cathode circuit of said tube, means for applying said positive synchronizing pulses to the cathode-control electrode circuit of said tube, and means for rendering the anode-cathode path of said tube non-conductive except during each interval of coincidence of a deflection-rate pulse and a synchronizing pulse.

19. In a television receiver horizontal AFC system, a circuit for generating periodic pulses having an energy content proportional to the phase displacement between synchronizing pulses and line-frequency keying pulses comprising, in combination, a source of positive keying pulses, a source of positive synchronizing pulses, a single limiter-amplifier tube having at least anode and cathode and control electrodes, means for applying said positive keying pulses to the sanode-cathode circuit of said tube, means for applying said synchronizing pulses to the cathode-control electrode circuit of said tube, and means for rendering the anode-cathode path of said tube non-conductive except during each interval of coincidence of a positive-keying pulse and a synchronizing pulse.

20. In a television receiver AFC system, a circuit for generating periodic pulses having an energy content proportional to the phase displacement between synchronizing pulses and keying pulses comprising, in combination, a source of positive keying pulses, a source of synchronizing pulses, a vacuum tube having at least anode and cathode and control electrode, means for separately applying said keying pulses and said synchronizing pulses to the output and input circuits of said tube, and means for rendering the anode-cathode path of said tube non-conductive except during each interval of coincidence of a keying pulse and a synchronizing pulse.

21. In a television receiver, the combination of a line-deflecting system of the type which is frequency-controlled by a unidirectional control potential, and a control circuit for developing said potential, said control circuit comprising a vacuum tube having at least anode, cathode, and control electrodes, means coupling an output circuit of said line-deflecting system to the anode circuit of said tube to periodically apply positive keying pulses to said anode, means for applying synchronizing pulses to the input circuit of said tube comprised of said cathode and control electrode, means for rendering said tube nonconductive except during each interval of coincidence of a keying pulse and a synchronizing pulse, whereby said tube generates resultant periodic pulses, means for integrating said resultant pulses into said control potential representative of the phase difference between said synchronizing pulses and said keying pulses, and means for applying said potential to said line-deflecting system to stabilize said phase difference.

22. An automatic frequency control circuit for an indirectly synchronized television picture tube deflecting system—said system being of the type which comprises beam-deflecting elements and a signal generator for generating deflection signals having a frequency at least in part determined by a control potential, and means for coupling said generator to said deflecting elements whereby to produce periodic beam-deflecting signals—comprising the combination of an electron tube having at least anode, cathode, and control electrodes, means for applying to the anode of said tube retrace pulses of positive polarity, thereby to key said tube into conductivity, means for applying horizontal synchronizing pulses of positive polarity to said control electrode, and means for rendering the anode-cathode path of said tube non-conductive except during each interval of coincidence of a retrace pulse of positive polarity and a horizontal-synchronizing pulse, whereby said tube generates periodic resultant pulses, the energy content of which varies with the relative phases of said synchronizing pulses and said retrace pulses, means for integrating said resultant pulses into said control potential, and means for applying said potential to said generator to maintain synchronism.

23. In a television receiver, the combination of a line-deflecting system of the type which is frequency-controlled by a unidirectional control potential, and a control circuit for developing said potential, said control circuit comprising a vacuum tube having at least anode, cathode and control electrodes, means coupling an output circuit of said line-deflecting system to the anode circuit of said tube to periodically apply positive keying pulses to said anode, means for applying synchronizing pulses to the input circuit of said tube comprised of said cathode and control electrode, means for rendering the anode-cathode path of said tube nonconductive except during each interval of coincidence of a keying pulse and a synchronizing pulse, whereby said tube generates resultant periodic pulses, means for integrating said resultant pulses into said control potential representative of the phase difference between said synchronizing pulses and said keying pulses, and means for applying said potential to said line-deflecting system to stabilize said phase difference.

References Cited in the file of this patent

UNITED STATES PATENTS

| | | |
|---|---|---|
| 1,963,246 | Purrington | June 19, 1934 |
| 2,163,217 | Schlesinger | June 20, 1939 |
| 2,211,860 | Plaistowe | Aug. 20, 1940 |
| 2,399,421 | Artzt | Apr. 30, 1946 |
| 2,428,946 | Somers | Oct. 14, 1947 |
| 2,431,577 | Moore | Nov. 25, 1947 |

FOREIGN PATENTS

| | | |
|---|---|---|
| 108,190 | Australia | Aug. 4, 1939 |